United States Patent [11] 3,585,518

[72] Inventors James J. Hitt
Willow Grove;
Gerald Mosley, Melrose Park, both of, Pa.
[21] Appl. No. 774,608
[22] Filed Nov. 12, 1968
[45] Patented June 15, 1971
[73] Assignee Leeds & Northrup Company
Philadelphia, Pa.

[54] MODULATOR EMPLOYING A SOLID-STATE ELECTRIC FIELD DEVICE

13 Claims, 2 Drawing Figs.

[52] U.S. Cl. 330/10, 330/38, 330/26, 330/85, 330/103, 332/31, 332/38
[51] Int. Cl. H03f 3/38, H03f 3/16
[50] Field of Search 332/31 T, 38, 42, 60, 63; 330/10; 325/181, 184

[56] References Cited
UNITED STATES PATENTS

| | | | |
|---|---|---|---|
| 3,281,718 | 10/1966 | Weberg | 332/31 |
| 3,371,290 | 2/1968 | Kibler | 332/31X |
| 3,391,354 | 7/1968 | Ohashi et al. | 332/31 |

*Primary Examiner*—Nathan Kaufman
*Attorney*—Woodcock, Kurtz & Mackiewicz

ABSTRACT: An improved FET modulator circuit is adapted to modulate the small potential difference between two varying signals. The two channel electrodes of the FET. are each connected to an input of a differential amplifier. The high-impedance input of a noninverting unity gain amplifier is connected to one of the channel electrodes while its low-impedance output is connected to the control electrode, whereby the control electrode follows the potential of the channel electrode. A high frequency switching potential is superimposed on the output of the unity gain amplifier.

MODULATOR EMPLOYING A SOLID-STATE ELECTRIC FIELD DEVICE

BACKGROUND OF THE INVENTION

This invention relates to a modulator for conversion of a small potential difference between two signals which may vary at a low frequency rate over a potential range which is large compared to said potential difference. The modulator converts this small low frequency potential difference to a high frequency signal which may be easily amplified. More particularly, this invention relates to a modulator of the solid-state electric field device type.

A major difficulty encountered with conventionally designed modulators of the solid-state electric field device type, i.e., FET type, is the necessity of providing sufficient high frequency switching potential to render the modulator conductive and nonconductive when variations of the channel electrode potentials are not negligible compared to the amplitude of the high frequency switching potential, e.g., are in the same order of magnitude.

While it may appear that the above-described difficulty may be solved by increasing the amplitude of the high frequency switching potential, such a solution is not practical because the amplitude required may exceed the maximum rating of the FET. Also it is costly to generate such high-amplitude switching potentials. Furthermore, switching transients may be excessive for some channel potential levels.

One prior art solution has been the use of an isolated high frequency switching potential source coupled between the control electrode and one of the channel electrodes. A disadvantage of such a system is that it is an unbalanced switching circuit which is unsuitable for modulating the input to a differential amplifier because the switching transients are unequal at the inputs of the differential amplifier and therefore do not cancel each other.

SUMMARY OF THE INVENTION

It is therefore an object of the invention to provide a modulator of the solid-state electric field device type whose operation is substantially unaffected by large variations of low frequency input signal level.

It is also an object of the invention to provide a modulator of the solid-state electric field device type wherein the large varying low frequency input signal does not substantially affect the control electrode to channel electrode switching voltages.

It is a further object of the invention to provide a modulator of the solid-state electric field device type having a balanced switching circuit which reduces switching transients compared to an unbalanced circuit.

In one embodiment of the invention, there is provided a modulator of the solid-state electric field device type for modulating the small potential difference between a signal of a first source and a signal of a second source, which signals may be varying at a low frequency rate. A first channel electrode of the device is coupled to the first source and a second channel electrode of the device is coupled to the second source. A low frequency coupling means couples one of the channel electrodes to the control electrode of the device. A high frequency coupling means couples a source of high frequency switching potential to the control electrode in order to superimpose the switching potential upon the potential of one of the channel electrodes at the control electrode. Within the scope of this invention, the terms "frequency" and "low frequency" serve to indicate mutually relative frequency relationships.

BRIEF DESCRIPTION OF THE DRAWINGS

This specification concludes with claims particularly pointing out and distinctly claiming the subject matter which is regarded as the invention. The invention may also be understood from the following description taken in connection with the accompanying drawings in which:

DESCRIPTION OF THE PREFERRED EMBODIMENTS

Figure 1:
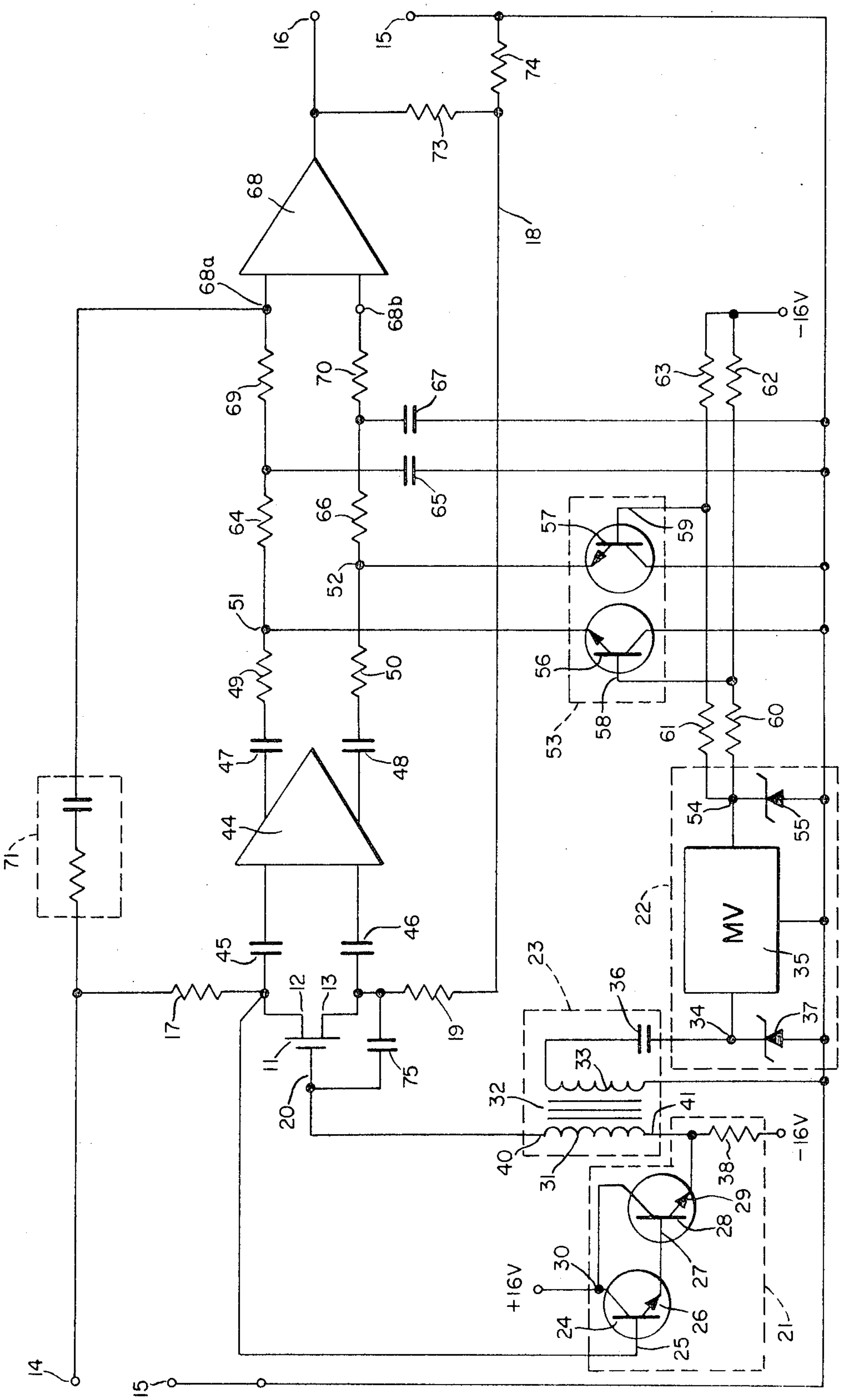
FIG. 1 is a schematic diagram of one embodiment of the invention in a general purpose precision DC amplifier.

Referring first to FIG. 1, the modulator of the invention is embodied in a general purpose precision DC amplifier. In essence, the modulator comprises a solid-state electric field device in the form of a field effect transistor 11 having a first channel electrode 12 and a second channel electrode 13. A first variable input signal from a first source is available at an input terminal 14. A second variable input signal is available from a second source, or in this case a feedback signal derived from the amplifier output terminal 16, which second input signal is closely related to said first signal. The first input signal is applied to the first channel electrode 12 through an impedance-balancing resistor 17 while the second input signal is simultaneously applied to the second channel electrode 13 through a feedback path 18 and a second impedance-balancing resistor 19 coupling the output terminal 16 to the FET 11.

Although the first input signal and the second input signal may vary over a wide range, the difference between the potential level of the first input signal and the potential level of the second input signal is relatively small. It is this difference in input potential levels appearing between the first channel electrode 12 and the second channel electrode 13 which is modulated by the FET 11 upon the application of an appropriate high frequency switching potential between a control or gate electrode 20 and the channel electrodes 12 and 13. In order to achieve the proper switching potential, one of the channel electrodes, in this case the first channel electrode 12, is low frequency coupled to the gate electrode 20 through a low frequency coupling means 21 having one terminal coupled to the channel electrode 12 and another terminal coupled to the control electrode 20. A switching potential available from a high frequency control signal source 22 is then superimposed upon the low frequency potential of the channel electrode 12 by a high frequency coupling means 23. The superimposed potential level of the first channel electrode 12 and the switching potential levels from the source 22 are then applied to the gate electrode 20 to periodically change the state of the FET 11. As used here, the terms "high" and "low" frequencies would typically involve a 10/1 or greater ratio.

The foregoing low frequency coupling means 21 has two characteristics. First, the low frequency coupling means 21 is characterized by substantially unity gain from the one terminal to the other. Second, the low frequency coupling means 21 is characterized by a relatively high-input impedance at the terminal coupled to the channel electrode 12 so as not to load the input signal source at the input terminal 14 or at the channel electrode 12.

The characteristics of unity gain and high-input impedance are satisfied if the low frequency coupling means 21 comprises amplifying means in the form of a transistor emitter-follower circuit. As shown, the emitter-follower circuit is a Darlington circuit comprising transistor means in the form of a first transistor 24 having a base electrode 25 coupled to the first channel electrode 12 and an emitter electrode 26 coupled to a base electrode 27 of a second transistor 28. An emitter electrode 29 of the second transistor 28 is then connected to a negative power supply through an emitter resistor 38. A positive power supply is connected to the collectors 30 of the two transistors 24 and 28. The use of both positive and negative power supplies permits the emitter follower output to follow both positive and negative variations of the input signal. The low frequency coupling from the first channel electrode 12 to the gate electrode 20 is completed through a secondary 31 of a transformer 32.

In order to achieve superimposition of the high frequency switching potential on the output of the emitter follower, it is necessary to low frequency isolate the source of switching potential 22 from the gate electrode 20 while permitting coupling of the high frequency switching potential. The high frequency coupling means 23 comprising a primary 33 of the transformer 32 provides the required combination of high frequency coupling and low frequency isolation. The high frequency switching potential available at an output terminal 34 of a multivibrator 35 is clipped by regulating diode 37 and applied across the primary 33 through a coupling capacitor 36.

If the FET 11 is of the N-channel depletion type, that phase of the high frequency switching potential which drives the terminal 40 negative with respect to terminal 41 of the secondary 31 will drive the FET 11 into the nonconductive state. Similarly, that phase of the switching potential which drives the terminal 40 positive with respect to the terminal 41 will drive the FET 11 into the conductive state. Note that the superimposition described in the preceding paragraph will result in the driving of the gate electrode 20 negative and positive with respect to the first channel electrode 12. Since a forward bias on the FET 11 could produce damage if a junction-type FET were used, the embodiment of FIG. 1 is shown as employing an FET 11 of the insulated gate type.

Although the invention is intended to encompass the use of low-level modulators wherein there are two substantially independent sources of input signals, it is likely that two sources of potential signals which are nearly equal will be dependent. Accordingly, the invention as disclosed in FIG. 1 has been embodied in a feedback amplifier environment which provides a second source of input signal. This amplifier is of the well-known chopper stabilized wide bank type wherein the input signal applied to the input terminal 14 is divided into a high frequency component and a low frequency component. The low frequency component is applied to the first channel electrode 12 through the impedance-balancing resistor 17 to establish a difference signal when compared with the second signal or feedback signal obtained from the output terminal 16 and applied through the feedback path 18 including the impedance-balancing resistor 19. Impedance-balancing resistors 17 and 19 may be replaced by balancing impedances which include low-pass filter networks to prevent high frequency components from appearing at the modulator. The difference signal is then modulated by the FET 11 and applied to a differential amplifier 44 through coupling capacitors 45 and 46. After amplification of the modulated difference signal by the differential amplifier 44, the amplified modulated difference signal is applied through DC isolator capacitors 47 and 48 and resistors 49 and 50 to demodulation points 51 and 52.

A demodulator 53 driven by a high frequency switching potential available at a second output terminal 54 of the multivibrator 35 and regulated by a Zener diode 55 will effect full-wave rectification of the amplified modulated difference signal. The demodulator 53 includes first and second transistors 56 and 57 having base electrodes 58 and 59 which are connected to the multivibrator output terminal 54 through resistors 60 and 61 and connected to a negative power supply through resistors 62 and 63. After demodulation, the amplified difference signal is filtered by low-pass filters comprising a first filter resistor 64 in combination with a first filter capacitor 65 and a second filter resistor 66 in combination with a second filter capacitor 67. The resultant filtered output is now applied to input terminals 68*a* and 68*b* of a wide band differential amplifier 68 through buffer resistors 69 and 70. After passing through an RC network 71, the high frequency component of the input signal from input terminal 14 is also applied to terminal 68*a*. The foregoing input signals to wide band amplifier 68 result in an amplifier output voltage at output terminal 16 which is proportional to the sum of the low frequency and high frequency components of the input signal at input terminal 14. This output from the terminal 16 is attenuated by the divider network consisting of resistors 73 and 74 and the attenuated voltage is fed back through the feedback path 18 and the impedance balancing resistor 19 to the channel electrode 13.

It is possible to reduce the switching transients associated with an FET by balancing the channel to control electrode capacitance by the addition of a capacitor between the control electrode and a channel electrode. Accordingly, and in compliance with the teachings of U.S. Pat No. 3,337,335 assigned to the assignee of the present invention, a capacitor 75 has been connected between the gate electrode 20 and the second channel electrode 13 of the FET 11.

Figure 2:
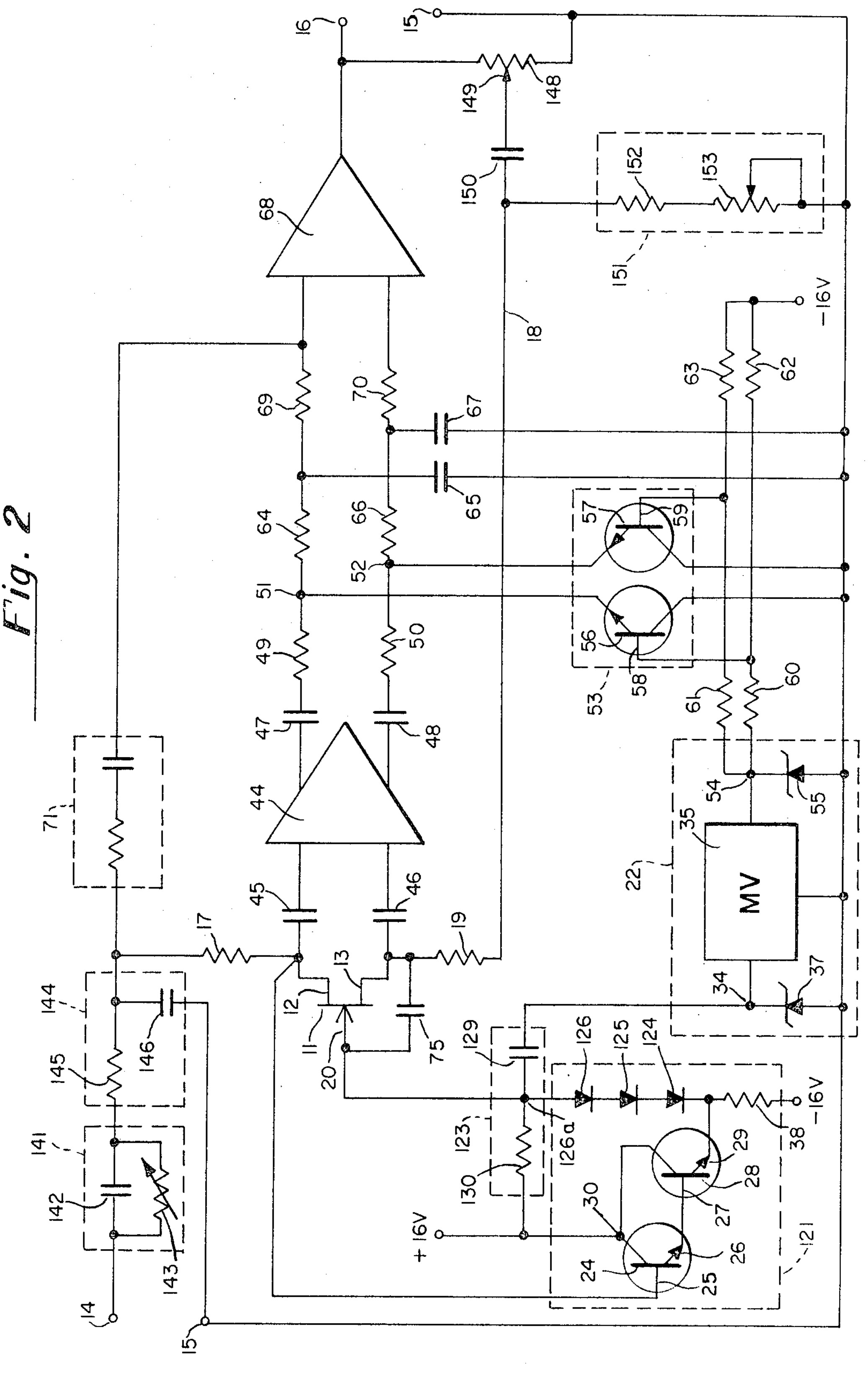
FIG. 2 is a schematic diagram of another embodiment of the invention in an electronic controller.

In describing the electronic controller schematically depicted in FIG. 2, those components which are substantially identical to corresponding components in the precision amplifier of FIG. 1 are designated with identical numbers. In FIG. 2 the means by which the high frequency switching potential is superimposed on the low frequency output of the emitter-follower circuit includes in series connection the capacitor 129 and the identically poled series connected diodes 124, 125 and 126. The positive peaks of the high frequency output of the multivibrator 35 are clipped by the regulating diode 37 and the opposite peaks are substantially at the potential of the common terminal 15. The resultant regulated high frequency potential is applied to one electrode of the coupling capacitor 129 whose other electrode is connected to the anode of diode 126 at junction 126*a*. The cathode of diode 124, which is remote from the capacitor 129, is connected to the emitter 29 of transistor 28 which is the output of the emitter-follower circuit.

With the connections described above, the diodes 124, 125 and 126 conduct during positive peaks of the high frequency switching potential so that the potential at the junction 126*a* exceeds the emitter follower output potential by the forward voltage drops across the diodes 124, 125 and 126.

The potential of the channel electrode 12 exceeds the output potential of the emitter-follower by the combined base-emitter drops of the transistors 28 and 24. The circuit is designed so that the combined forward drops across the diodes 124, 125 and 126 are substantially equal to and therefore compensate for the foregoing base-emitter drops. Thus, the positive peaks of the high frequency switching voltage are effectively clamped to the potential of channel electrode 12 which may be varying at a low rate compared to the high frequency switching signal. During the opposite peaks of the high frequency switching potential, the diodes 124, 125 and 126 do not conduct so that the voltage at junction 126*a* is reduced below the potential of the channel electrode 12 by the amplitude of the high frequency switching potential. Under this condition the control electrode 20 of the FET 11 which is connected to the junction 126*a* is driven sufficiently negative with respect to the channel electrode voltage to render the N-channel junction-type FET 11 nonconductive. On the positive peaks of the switching potential previously described, the control electrode voltage is clamped close to the channel electrode voltage causing FET 11 to be conductive.

Since the potential of the control electrode 20 must vary in response to low frequency variations in the channel voltage, the capacitor 129 must be capable of charging and discharging accordingly. It is apparent from the circuit that the voltage of the control electrode 20 can be reduced by discharge of the capacitor 129 through the diodes 126, 125 and 124 and resistor 38. This corresponds to the decrease in instantaneous amplitude of the slowly varying low frequency signal. However, the voltage of the control electrode 20 cannot be increased corresponding to the increase of instantaneous amplitude of the slowly varying low frequency by charging the capacitor 129 through this same path owing to the blocking action of the diodes 124, 125 and 126. For this reason, the high valued resistor 130 is connected from the control electrode to a potential which is sufficiently positive to forward bias the diodes 124, 125 and 126.

The circuit time constant which is equal to the product of capacitor 129 and resistor 130 is made large compared to the period of the high frequency switching potential but equal to or smaller than the minimum period of the low frequency channel potential, whereby the high frequency peak potential at the control electrode 20 follows the low frequency variations of the channel potential.

In order for the positive peaks of the high frequency switching potential to be clamped to the low frequency channel electrode potential as previously described, the capacitor 129 must be discharged rapidly during conduction of the diodes 124, 125 and 126. This requires that the time constant formed by the product of the capacitor 129 and the effective resistances of the emitter follower output, the conducting diodes 124, 125 and 126, and the source of high frequency switching potential be small compared to the period of the high frequency switching potential. The low-output resistance characteristic of the emitter-follower circuit aids in satisfying this requirement, while its high-input resistance avoids loading of the amplifier input as previously noted.

Although the embodiment of FIG. 2 is similar to that of FIG. 1, it includes several additional networks which are required to serve the functions of an electronic controller. One of the functions is that of rate adjustment which is provided ny the rate adjustment network 141 connected to the input terminal 14. The rate adjustment network 141 includes a parallel combination including a capacitor 142 and an adjustable resistor 143 providing the adjustability aspect of the network. A low-pass filter network 144 comprising a filter resistor 145 and a filter capacitor 146 connected back to the common terminal 15 is connected in series with the rate adjustment network 141.

A proportional band control function is provided by a potentiometric resistor 148 connected between the output terminal 16 and the common terminal 15. The control aspect of the potentiometric resistor 148 is provided by an adjustable tap 149 which forms part of the feedback path 18 to the second channel electrode 13.

Another function is provided in the feedback path 18 by reset circuitry comprising a reset capacitor 150 and an adjustable reset resistive network 151. The reset capacitor 150 is connected to the adjustable tap 149 and one terminal of a fixed resistor 152 in the resistive network 151. The other terminal of the resistor 152 is connected to the common terminal 15 through an adjustable resistor 153 providing the means for controlling reset time.

Although both embodiments of the invention disclose a balancing capacitor 75 for reduction of switching transients, it is not intended to limit the invention to utilization in such a combination.

Although two embodiments of the invention have been described, it will be apparent to those skilled in the art that certain modifications of the modulator described may be made within the scope of the invention. For instance, the drive requirements of other types of FET might be met by the use of more or fewer diodes than the three diodes 124, 125 and 126 shown in FIG. 2, or by inverting such diodes and employing PNP emitter follower transistors to reverse the drive voltage polarity, or by including additional DC potential sources, e.g., batteries, to bias the FET control electrode.

What we claim as new and desire to be secured by Letters Patent of the United States is:

1. A modulator for modulating the potential difference signal between two input potential levels at least one of which is varying comprising:

a solid-state electric field device including a control electrode, a first channel electrode coupled to a source of one of said input potentials levels, and a second channel electrode coupled to a source of the other of said input potential levels;

a high frequency control signal source generating switching potential levels for periodically changing the state of said electric field device;

a low frequency coupling means comprising amplifying means coupled between said first channel electrode and said control electrode and characterized by a high input impedance at one terminal coupled to said first channel electrode and substantially unity voltage gain from said one terminal to another terminal coupled to said control electrode, said low frequency coupling means maintaining substantially the same potential levels at said first channel electrode and said other terminal; and a high frequency coupling means coupled between said high frequency control signal source and said control electrode for applying the switching potential levels to said control electrode superimposed upon the potential level at said other terminal of said low frequency coupling means to periodically change the state of said device.

2. The modulator of claim 1 wherein said amplifying means comprises transistor means connected in emitter-follower configuration with the emitter coupled to said control electrode and the base coupled to said first channel electrode.

3. The modulator of claim 1 wherein one of said two signals is an input signal, said modulator comprising:

a differential amplifier coupled between said first channel electrode and said second channel electrode for amplifying the modulated potential difference signal thereacross;

demodulating means coupled to the output of said differential amplifier for demodulating the amplified modulated difference signal; and feedback means coupled between the output of said demodulating means and said second channel electrode for coupling the demodulated output signal to said second channel electrode to establish said potential difference signal between said input potential levels of an input signal coupled to said first channel electrode and the feedback signal coupled to said second channel electrode.

4. The modulator of claim 3 wherein said high frequency coupling means comprises a transformer having a primary winding coupled to said source of switching potential and a secondary winding coupled between said other terminal of said low frequency coupling means and said control electrode.

5. The modulator of claim 4 wherein said solid-state electric field device comprises a field effect transistor of the insulated gate type.

6. The modulator of claim 5 further including a capacitor connected between said control electrode and first said channel electrode.

7. The modulator of claim 2 wherein said low frequency coupling means comprises at least one diode means characterized by a forward biased voltage drop substantially compensating for the forward biased emitter voltage drop of said transistor means.

8. The modulator of claim 7 including a source of potential and a high-valued resistor connected between said source of potential and said diode means for forward biasing said diode means.

9. The modulator of claim 8 wherein said high frequency coupling means comprises a coupling capacitor.

10. The modulator of claim 9 wherein said solid-state electric field device comprises a field effect transistor of the junction type.

11. The modulator of claim 10 further including a capacitor connected between said control electrode and said first channel electrode.

12. A modulator for modulating the potential difference signal between two input potential levels at least one of which is varying comprising:

a solid-state electric field device including a control electrode, a first channel electrode coupled to a source of one of said input potential levels, and a second channel electrode coupled to a source of the other of said input potential levels;

a low frequency coupling means including amplifying means characterized by a high-input impedance and unity gain, said coupling means having one terminal coupled to said first channel electrode and another terminal coupled to said control electrode maintaining substantially the same potential levels at said one terminal and said other terminal; and a high frequency coupling means for coupling a source of a high frequency control signal to said control electrode superimposed upon the potential level at said other terminal to periodically change the state of said device.

13. The modulator of claim 12 wherein said amplifying means comprises transistor means connected in emitter-follower configuration with the emitter coupled to said control electrode and the base coupled to said first channel electrode.

L-566

PO-1050
(5/69)

UNITED STATES PATENT OFFICE
CERTIFICATE OF CORRECTION

Patent No. 3,585,518 Dated June 15, 1971

Inventor(s) James J. Hitt and Gerald Mosley

It is certified that error appears in the above-identified patent and that said Letters Patent are hereby corrected as shown below:

Col. 1, line 69, "frequency" (first occurrence) should read --"high frequency"--.

Col. 3, line 34, "bank" should read --band--.

Col. 4, line 8, "No. 3,337,335" should read --No. 3,337,353--.

Col. 5, line 24, "ny" should read --by--.

In the claims:

Cl. 1, col. 5, line 70, "potentials" should read --potential--.

Cl. 7, col. 6, line 52, "biased emitter" should read --biased base emitter--.

Signed and sealed this 13th day of June 1972.

(SEAL)
Attest:

EDWARD M.FLETCHER,JR.
Attesting Officer

ROBERT GOTTSCHALK
Commissioner of Patents